July 8, 1930.  W. C. ERKERT  1,769,945
WIRE ROPE OR CABLE
Filed Jan. 25, 1929

INVENTOR.
William C. Erkert
LaPorte & LaPorte
Atty's

Patented July 8, 1930

1,769,945

UNITED STATES PATENT OFFICE

WILLIAM C. ERKERT, OF PEORIA, ILLINOIS

WIRE ROPE OR CABLE

Application filed January 25, 1929. Serial No. 334,914.

This invention has reference to wire ropes or cables.

The invention has for its object to provide a wire rope or cable adaptable particularly for heavy and hard usage, such as is necessitated in rotary and standard well drilling, hoisting of elevators and for general hauling and hoisting where employed on derricks, dredges, cranes and for numerous other uses, wherein flexibility and long life of service of such rope or cable is essential.

The invention has for its principal object to provide a wire rope or cable of the character referred to, including a cluster of cylindrical wire strands, each strand consisting of a multiplicity of spirally wound or twisted single wires, said strands being twisted or spirally wound around an axially disposed cylindrical core of resilient and flexible material, such as rubber, whereby upon the winding or twisting of the strands about said core, the former will be imbedded into the latter and the latter compressed into and between the wires of the former, resulting in a reduction of the core by reason of such compression thereof by said strands wound therearound, making a substantially unified structure of great tensile strength and flexibility.

The invention has for a further object to reduce the presence of internal friction in wire ropes or cables, which friction is known to be greatest at the center of such structure, and by the provision of a centrally and axially disposed rubber core, such internal friction being materially reduced, if not entirely eliminated, thereby lengthening the life of the rope or cable and reducing replacement and repair costs thereof; further, a rubber core disposed in a wire rope or cable in the manner hereinabove referred to, due to the character of such material, affords a cushion for the surrounding clusters of wire strands when subjected in use to unusual compressions and shocks resulting in such rope or cable retaining its original roundness of shape, and further, the provision of a wire rope or cable including a central and axially disposed rubber core presents a lubricating action to the surrounding wire strands of the rope or cable when exposed to dampness or wetness when used in wet well drilling and dredging, thereby increasing the life of such rope or cable as compared with wire ropes or cables employing fibrous centers, such as hemp and like materials which is known to disintegrate and become quickly destroyed when subjected to such elements, as for instance, water, salt water and sulphur, generally encountered in the drilling of wells and dredging.

That the invention may be more fully understood, reference is had to the accompanying drawing forming a part of the description and illustrating a preferred embodiment of the invention, in which:—

Like characters of reference denote corresponding parts throughout the figures.

Figure 1:
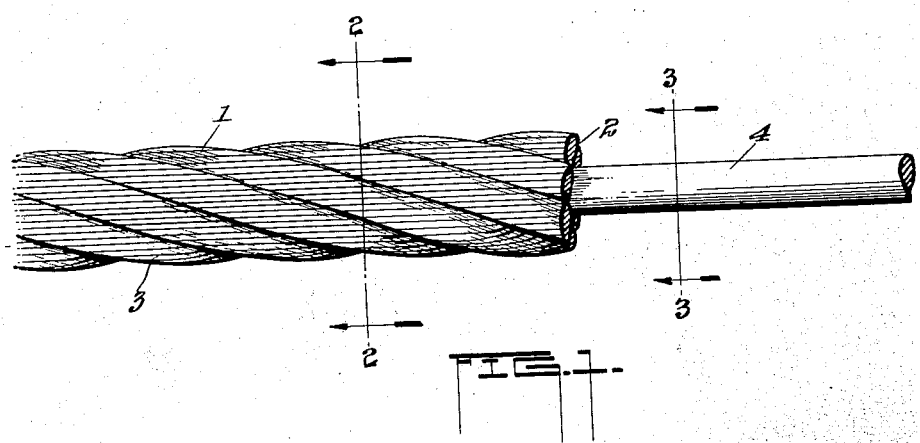
Fig. 1 is a section of my improved wire rope or cable showing the axially disposed rubber core extending from said rope or cable.

Reference being had to the drawing, 1 designates my improved wire rope or cable, see Fig. 1, which consists of a cluster or plurality of spirally wound or twisted strands of cable wire 2. Said strands include a multiplicity of single units of wire 3, preferably of steel, which are also spirally wound or twisted throughout their length into a cylindrical strand or cable, and being a tightly wound or twisted structure presents a unified strand of cable wire capable of much abuse, hard wear and resistance, and having great tensile strength due to such multiplicity of spirally wound single units of wire.

Figure 2:
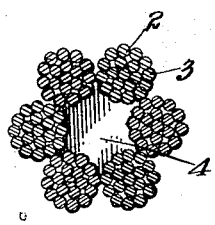
Fig. 2 is a cross-sectional view as the same would appear if taken on the line 2—2, Fig. 1.
Figure 3:
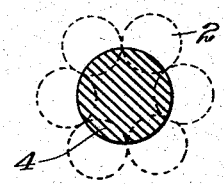
Fig. 3 is a cross-sectional view taken through the extended core of the rope or cable as the same would appear if taken on the line 3—3, Fig. 1, the wire strands of the rope or cable shown diagrammatically in dotted lines.

The strands of cable wire 2, see Figs. 1 and 2, are spirally wound or twisted around a substantially solid cylindrical core 4 of resilient and flexible material, such as cured or vulcanized rubber, which is adapted to be centrally and axially disposed within and throughout the length of said spirally wound or twisted strands of cable wire 2. The diameter of said rubber core 4 is preferably greater than the diameter of the twisted strands of cable wire 2, see Fig. 3, for the reason that during the process of assembling the completed wire rope or cable 1, the winding or twisting of the strands 2 about the core 4 will cause the rubber core to be reduced in diameter and compressed into and between the spaces of adjacently positioned single units of wire 3, and into and between the spaces of the adjacently wound strands of cable wire 2, see Fig. 2, or in other words, resulting in the imbedment of the cable strands 2 in the core 4 and making a substantially unified structure including an outer armor of tightly wound strands of cable wire and a flexible and resilient core centrally and axially disposed therewithin presenting a wire rope or cable of great tensile strength and flexibility.

It will be understood that a wire rope or cable constructed in this manner and employing a centrally and axially disposed rubber core therein presents a rope or cable having greater resistance to external abuses, such as heavy loads, compressions and shocks; greater flexibility; greater uniformity of shape over long periods of use and freedom from disarrangement of the component parts thereof by reason of subjection to shocks, abuse and moisture due to the location and placement of said core being centrally and axially disposed therein.

I am aware that it is broadly old, as disclosed in the prior patent art, to provide a wire rope or cable having a rubber core for the purpose of possessing the rope or cable with requisite flexibility and durability and reference is especially made to Letters Patent No. 400,970 dated April 9th, 1889, to C. M. Thompson for Improvements in a rope or cable. It is to be noted, however, that the Thompson cable is of a compound character, including a central non-extensible slightly-elastic and flexible core, as rope or hemp, with surrounding layers of wire wound thereupon, which core is then surrounded with a layer of a desired depth of rubber, the rubber being surrounded or inclosed by an external wrapper of spirally wound wire of preferably large gauge.

My improved wire rope or cable is simply manufactured requiring only the steps of first stranding or twisting the single units of wire into strands of cable and then spirally winding or twisting a plurality of such strands about a solid cylindrical core of cured or vulcanized rubber adapted to be centrally and axially disposed throughout said cable, which not only results in lower costs of manufacture due to a minimum number of processes required and the enabling of the use of high speed machinery for each step in the process reducing the cost to a minimum but effecting the manufacture of a wire rope or cable of highest quality and durability for the uses hereinabove enumerated.

What I claim is:

A wire rope comprised in its entirety of a cured integral rubber core having a plurality of radial projections, and a plurality of wire strands twisted about the core, the adjacent strands being in contact with each other and being imbedded in the rubber core, whereby portions of the rubber core engage and provide a surface lubricating action in the spaces between adjacent strands, which radial portions extend into and seal the inner spaces between adjacent sides of adjacent strands, said core and strands being related so that the core forms a liquid proof seal for the parts of the strands which confront the core thereby to leave the remainders of the strands beyond said radial portions of the core freely exposed to the surrounding air.

In witness whereof, I have hereunto affixed my hand this 17th day of January, 1929.

WILLIAM C. ERKERT.